(12) United States Patent
Piantoni

(10) Patent No.: US 7,802,823 B2
(45) Date of Patent: Sep. 28, 2010

(54) HOLDING BACK DEVICE FOR A PRESSURE HOSE

(75) Inventor: Daniele Piantoni, Brescia (IT)

(73) Assignee: OP S.r.l., Brescia (IT)

( * ) Notice: Subject to any disclaimer, the term of this patent is extended or adjusted under 35 U.S.C. 154(b) by 524 days.

(21) Appl. No.: 11/762,835

(22) Filed: Jun. 14, 2007

(65) Prior Publication Data
US 2007/0252385 A1 Nov. 1, 2007

Related U.S. Application Data

(63) Continuation of application No. PCT/IT2005/000165, filed on Mar. 24, 2005.

(51) Int. Cl.
*F16L 13/04* (2006.01)
(52) U.S. Cl. ........................ 285/114; 403/11
(58) Field of Classification Search .................. 403/11, 403/12; 285/1, 23, 114, 304
See application file for complete search history.

(56) References Cited

U.S. PATENT DOCUMENTS

| | | | | | |
|---|---|---|---|---|---|
| 394,870 | A | * | 12/1888 | McGahan | 73/328 |
| 1,145,532 | A | * | 7/1915 | Webb | 285/23 |
| 1,532,549 | A | * | 4/1925 | Ransier | 285/114 |
| 2,291,802 | A | * | 8/1942 | Goodall | 285/117 |
| 2,533,640 | A | * | 12/1950 | Ulrich | 137/614.04 |
| 2,699,961 | A | * | 1/1955 | Omon | 285/62 |
| 2,814,507 | A | * | 11/1957 | Lattimore | 285/23 |
| 3,179,442 | A | * | 4/1965 | Lofgren | 285/7 |
| 3,249,370 | A | * | 5/1966 | Brodgen | 285/81 |
| 3,347,566 | A | * | 10/1967 | Nelson | 285/1 |
| 3,813,733 | A | * | 6/1974 | Flohr | 285/117 |
| 4,093,282 | A | * | 6/1978 | Kyriakodis | 285/114 |
| 4,549,332 | A | * | 10/1985 | Pouliot | 24/335 |
| 4,660,862 | A | * | 4/1987 | Cassel et al. | 285/114 |
| 4,796,925 | A | * | 1/1989 | Zwicker | 285/114 |
| 4,948,179 | A | * | 8/1990 | Kulikowski et al. | 285/316 |
| 5,281,042 | A | * | 1/1994 | Belrose | 403/234 |
| 5,368,337 | A | * | 11/1994 | Torres | 285/114 |
| 5,507,533 | A | * | 4/1996 | Mumma | 285/114 |
| 5,689,862 | A | | 11/1997 | Hayes et al. | |
| 5,873,608 | A | * | 2/1999 | Tharp et al. | 285/114 |

FOREIGN PATENT DOCUMENTS

GB 2 237 346 A 5/1991

OTHER PUBLICATIONS

International Search Report for PCT/IT2005/000165 dated Dec. 1, 2005.

* cited by examiner

*Primary Examiner*—Aaron M Dunwoody
(74) *Attorney, Agent, or Firm*—Kilyk & Bowersox, P.L.L.C.

(57) ABSTRACT

The present invention relates to a holding back device for holding a hose to a fixed abutment and also relates to a mounting assembly.

21 Claims, 4 Drawing Sheets

HOLDING BACK DEVICE FOR A PRESSURE HOSE

This application is a continuation of PCT/IT2005/000165, filed Mar. 24, 2005.

BACKGROUND OF THE INVENTION

1. Field of the Invention

The present invention relates to a holding back device for a pressure hose, in particular a flexible hose.

2. Description of the Prior Art

In the field of oil pressure components, the need providing for holding back devices capable of holding a hose containing a fluid at a pressure imposed by the regulations is increasingly felt.

In fact, it is known that following special operative requirements or special operating conditions of an oil pressure system, the fluid under pressure, if such pressure exceeds the value imposed by the regulations, could remove the hose from the joint it is connected to.

The occurrence of this event is often cause of accidents in the work environment, sometimes with serious consequences for the operators and damages to the other nearby machinery. In fact, the hose gets suddenly disconnected and the end portion is projected at high speed away from the joint, acting as a whip against everything on its trajectory.

In the field, several solutions of holding back devices have been devised, adapted for being associated to a hose and to the joint to prevent the hose disconnection.

Some of these solutions are disclosed, for example, in documents U.S. Pat. No. 4,549,332, U.S. Pat. No. 3,859,692, WO01/42703, GB2237346, CA1004250, U.S. Pat. No. 3,813,733, U.S. Pat. No. 3,249,370 and U.S. Pat. No. 5,873,608.

A known device comprises an anchoring member, a band adapted for being tightened to the hose and a chain for connecting the anchoring member to the band.

An example of embodiment according to the above description is shown in the Italian utility model no. 241161, by the same Applicant.

In this specific field, the trend however is to realise holding back devices increasingly capable of holding the hose to the joint at increasingly higher pressure values.

SUMMARY OF THE INVENTION

The object of the present invention is to provide a holding back device for a hose under pressure to a fixed abutment, for example a joint, which should be capable of ensuring the hold of the hose to the abutment.

BRIEF DESCRIPTION OF THE DRAWINGS

The features and advantages of the holding back according to the present invention will appear more clearly from the following description of an embodiment, made by way of an indicative non-limiting example with reference to the annexed drawings, wherein.

DESCRIPTION OF THE PREFERRED EMBODIMENTS

Figure 1:
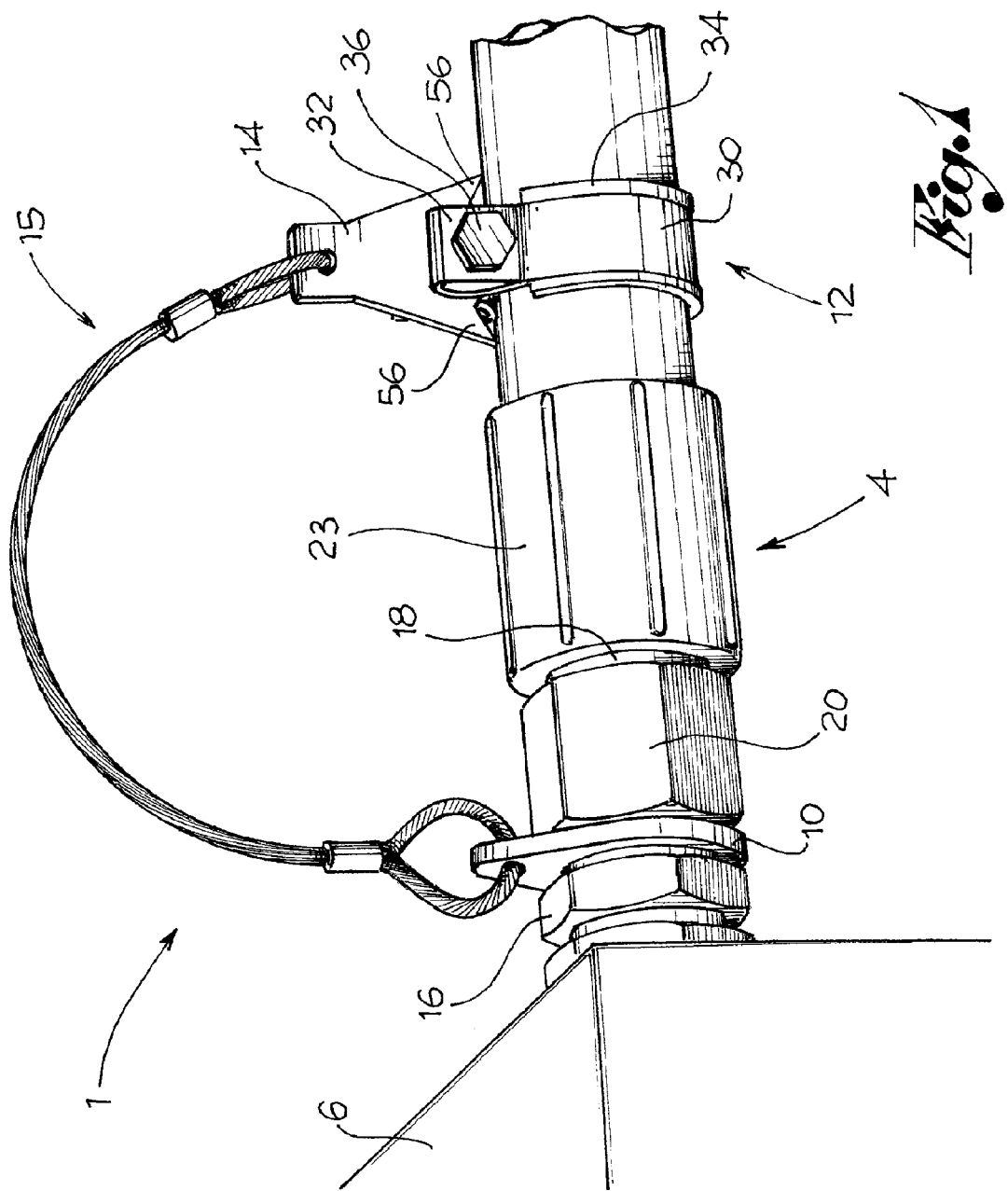
FIG. 1 shows a perspective view of an assembly comprising a hose of a system associated to a joint and to a holding back device, in a normal system operating condition.

For clarity of exposition, the description below is made with reference to a hose connected through a joint to a wall from which the fluid under pressure is fed, but it is clear that the holding back device according to the present invention is adapted for being used for holding back a hose connected through a joint to oil pressure actuators such as cylinders, valves, pumps and the like.

With reference to the annexed figures, reference numeral 1 globally denotes an assembly comprising a hose 2, for example flexible, a joint 4 for connecting the hose to a wall 6 and a holding back device for holding hose 2 to an abutment.

The holding back device comprises an anchoring member 10 adapted for connecting the device to an abutment, a band 12 adapted for being tightened to the surface of hose 2, an incision plate 14 connected to band 12 and a rope 15 adapted for connecting the anchoring member 10 to the incision plate 14.

Preferably, the anchoring member 10 exhibits a hole having a hole axis X-X perpendicular to the side surface 10a of the anchoring member 10.

Hose 2 exhibits a reinforcing outer cover 3b.

According to a first embodiment, joint 4 is associable to an adapter 16 for the connection to wall 6 (FIG. 1). In the embodiment, joint 4 comprises a tang 18 adapted for being inserted at least partly in an end portion 2a of hose 2, and a turning nut 20.

In the first embodiment, the anchoring member 10 is inserted on adapter 16 and nut 20 is screwed to the adapter, so that the anchoring member remains fixed between the nut 20 and adapter 16.

Figure 3:
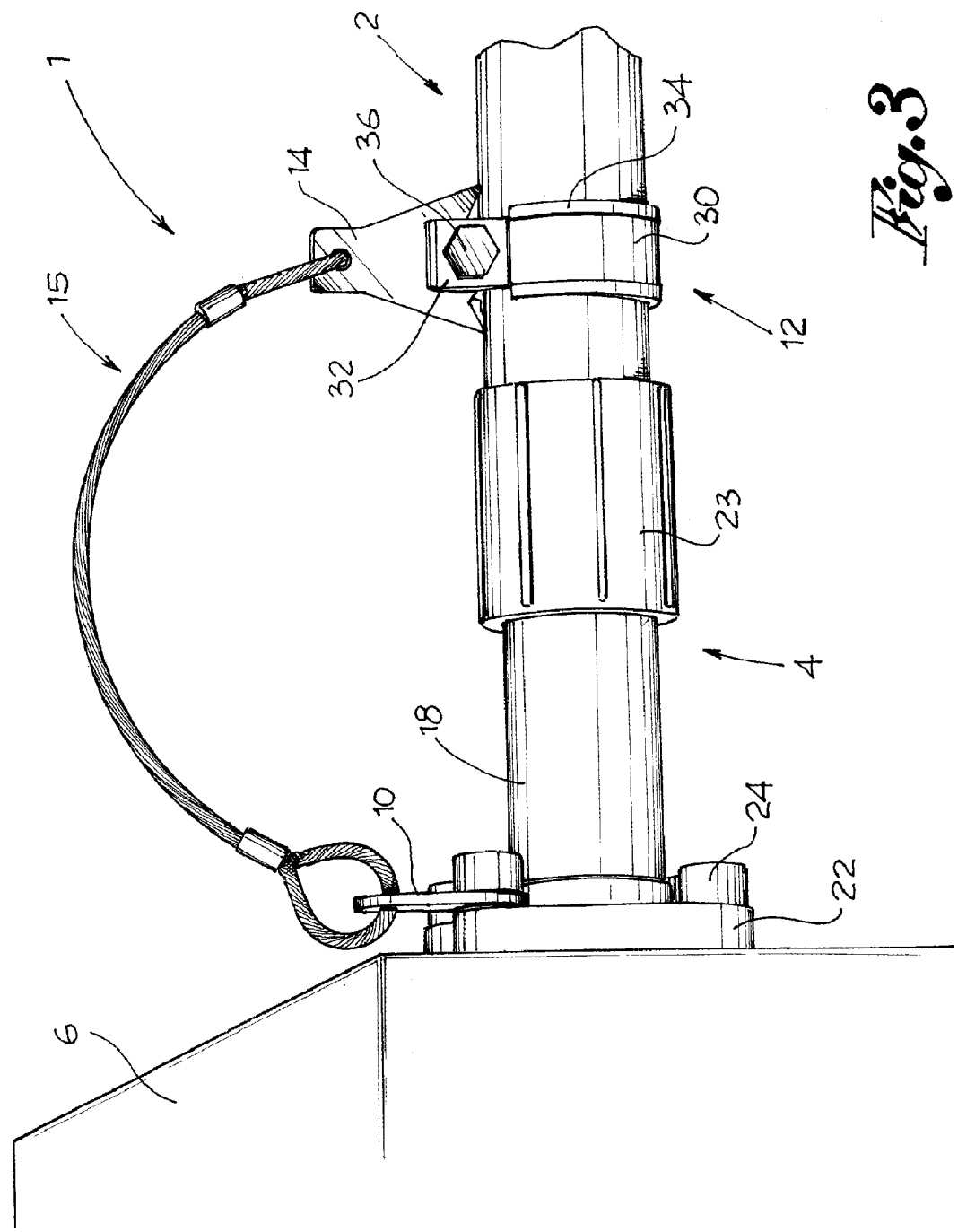
FIG. 3 shows a perspective view of a mounting assembly of the holding back device of FIG. 1.
Figure 4:
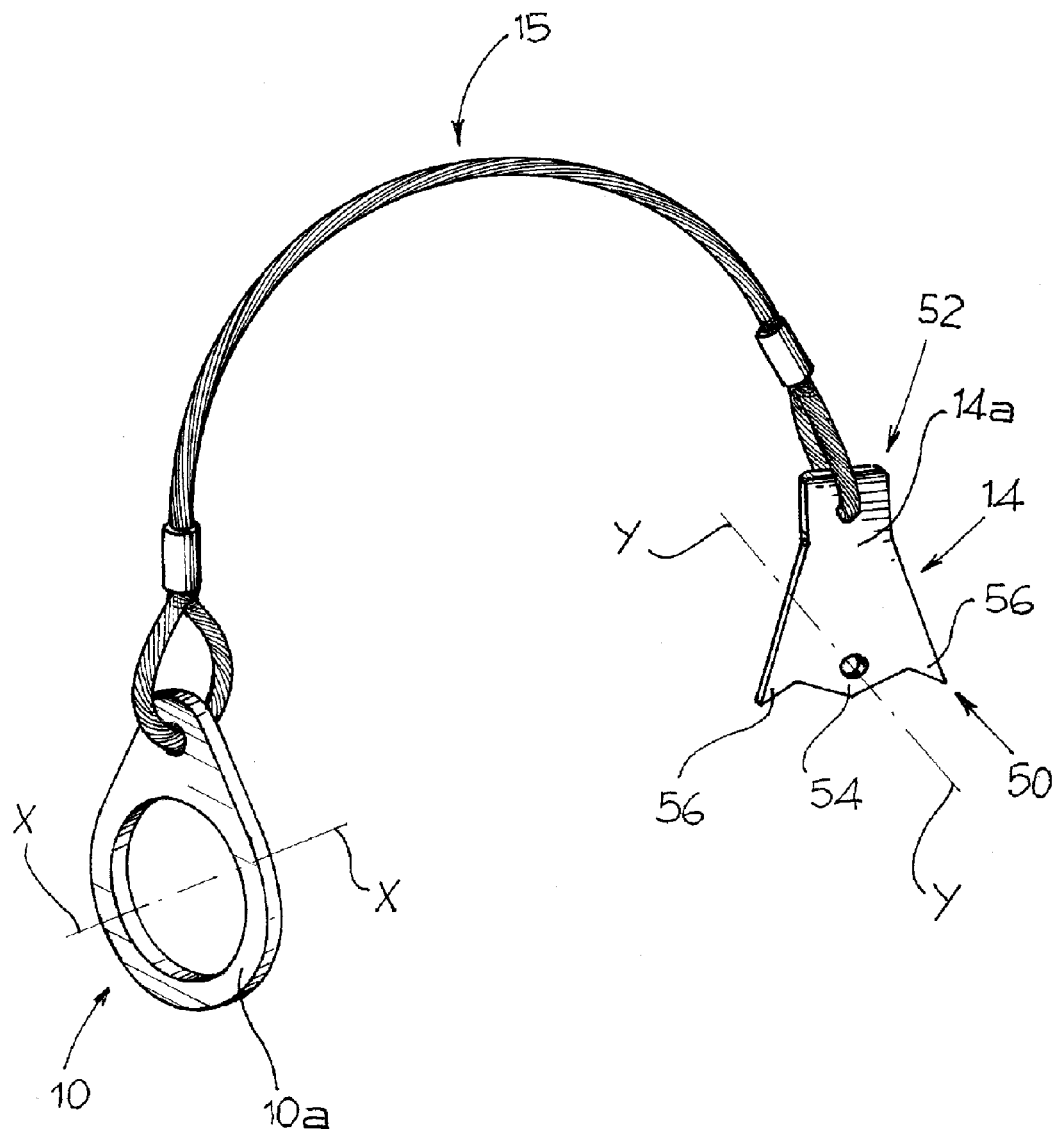
FIG. 4 shows a perspective view of the holding back device.

In a further embodiment, joint 4 comprises a tang 18 adapted for being inserted at least partly in the end portion 2a of hose 2, and a flange 22 for the connection to the wall (FIG. 3). In the embodiment, flange 22 is connected to the wall by some screws 24. In the embodiment, the anchoring member 10 is inserted into the stem of one of the screws 24 and fixed to flange 22.

The joint 4 is associable to a bush 23. In particular, the bush 23 is adapted for being associated to tang 18 of joint 4 and for covering the end portion 2a of hose 2.

The bush 23 is adapted for being deformed by a suitable assembly tool to obtain connection between hose 2 and joint 4 by pressing the end portion 2a of hose 2 between the tang 18 and the bush 23.

According to a preferred embodiment, the band 12 comprises a metal ring 30 adapted for surrounding the hose surface, and two facing projections 32.

Moreover, the band 12 comprises a rubber sheath 34 adapted for being inserted into the ring 30.

The sheath 34 is adapted for allowing, during the normal system operation, an expansion of the hose 2, generally mainly radial, preventing damages to the cover 3b of the hose 2.

The band 12 further comprises a screw 36 adapted for crossing the projections 32.

Once the screw 36 is screwed through the projections 32, the two projections 32 move closer, thus clamping the ring 30 of the band 12 on the surface of hose 2.

In other words, the projections 32 and the screw 36 realise a preferred embodiment of clamping means adapted for being handled by a technician for clamping the band 12 to the hose 2.

Preferably, the incision plate 14 is hinged to the portion of the stem of the screw 36 arranged between the projections 32 of the band 12.

The incision plate 14 is adapted for rotating about an axis of rotation Y-Y perpendicular to the front surface 14a of the plate 14.

The incision plate 14 extends between an active end 50, facing the outer surface of the hose 2 when plate 14 is hinged to the band 12, and a cooperation end 52, opposed to the active end 50.

The active end 50 exhibits an irregular pattern. In other words, the active end 50 exhibits a pattern determined by a broken line.

In particular, the pattern defines a central portion 54 and at least one tooth 56, the tooth being adapted for penetrating into the cover 3b of the hose 2.

Preferably, the teeth 56 are two and are next to the central portion 54.

Preferably, the tooth 56 is delimited by delimiting surfaces. For such surfaces, an outer incidence angle is defined with the hose side surface, on the side of the incision plate 14.

Preferably, the delimiting surfaces exhibit acute external incidence angles.

Moreover, an internal incidence angle is defined for the tooth 56. The internal incidence angle is defined as the angle comprised between the delimiting surfaces of the tooth.

Preferably, the internal incidence angle is an acute angle.

At the cooperation end 50, the incision plate 14 cooperates with the rope 15.

Preferably, the rope 15 comprises a plurality of strands, preferably made of a metal material, twisted to form the rope.

In other words, the rope 15 exhibits a bending stiffness, that is, when bent from a rectilinear configuration and then released, it exhibits the tendency to return to the initial configuration.

By virtue of this feature, the rope 15 realises a preferred embodiment of support means adapted for cooperating with the incision plate 14 for keeping it into position when hinged to the band 12.

In yet other words, since the rope 15, for connecting the anchoring member 10 to the incision plate 14 is bent, it exhibits the tendency to return to the initial rectilinear configuration. Such tendency causes a return action that affects the incision plate 14 keeping it standing on hose 2.

Preferably, at the ends, the rope 15 exhibits a slipknot for the connection to the anchoring member 10 and to the plate 14.

Preferably, a mounting assembly is provided comprising the anchoring member 10, the rope 15 and the incision plate 14 connected to one another.

During the normal system operation, the incision plate 14 is kept into position by rope 15. In the configuration, teeth 56 slightly touch the surface of hose 2, but preferably they don't, according to a non-interference arrangement.

During the normal system operation, hose 2 could undergo an expansion, generally mainly radial. In this case, the rubber sheath 34 allows such expansion thus preventing damages to cover 3b of hose 2.

Such normal operating configuration lasts up to a first value of the fluid pressure in the hose.

Above such first pressure value, hose 2 begins to remove from tang 18 of joint 4.

In a partial extraction configuration, the end portion 2a of hose 2 is partly extracted from tang 18 and from bush 23, rope 15 affects the incision plate 14 rotating it relative to the non-interference arrangement.

Figure 2:
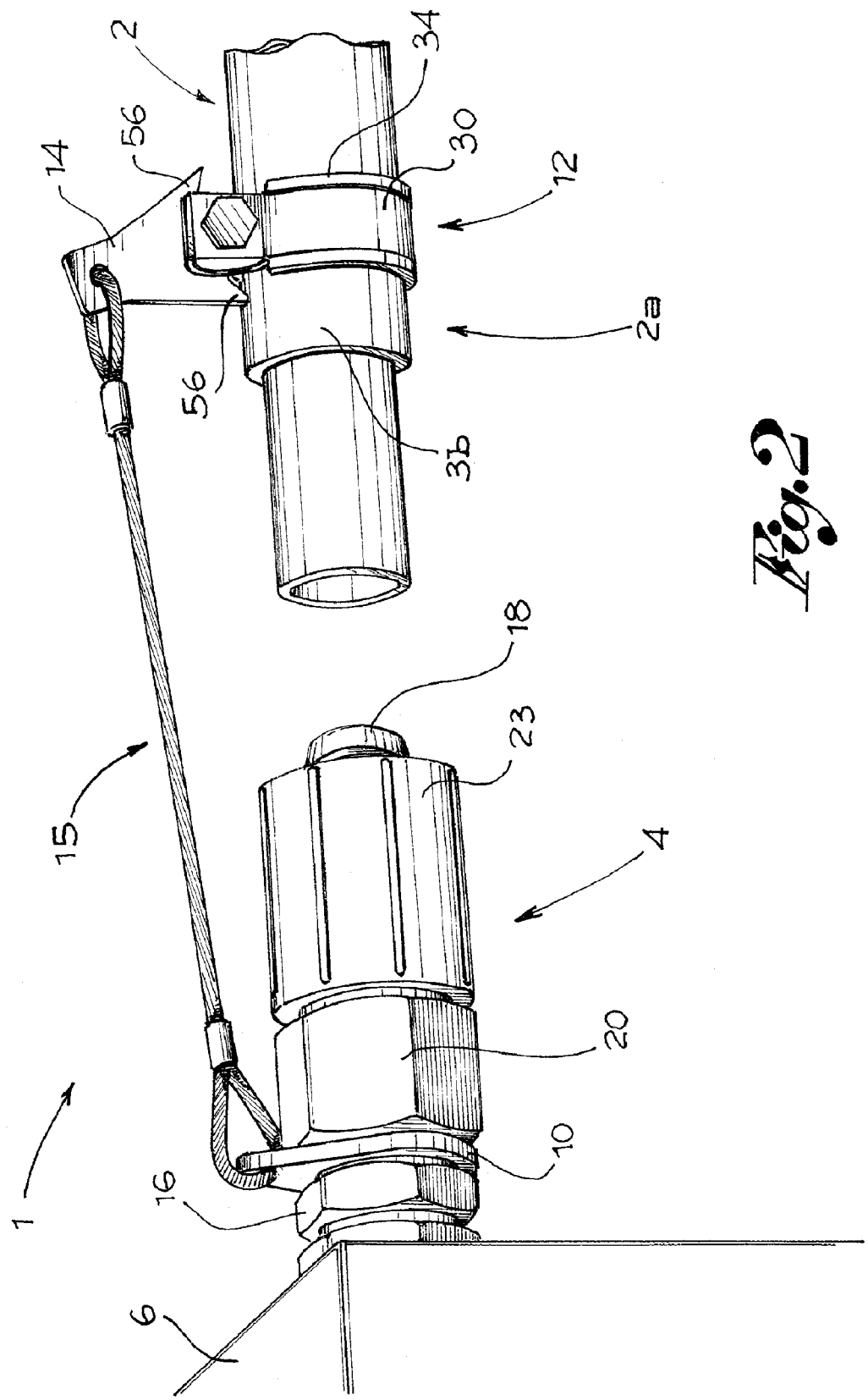
FIG. 2 shows the assembly of FIG. 1 in a hose extraction configuration.

In a complete extraction configuration, the end portion 2a of hose 2 is fully extracted from tang 18 and from bush 23 (FIG. 2).

The passage from partial extraction to full extraction is sudden and the energy trapped in the system due to the pressurised fluid suddenly changes into kinetic energy of the end portion 2a of hose 2. Such portion tends to be projected away from the joint.

The sudden movement of the end portion 2[deg.] of hose 2 makes rope 15 become suddenly tensioned, so that tooth 56 penetrates into cover 3b of hose 2.

If hose 2 is even partly extracted from band 12, tooth 56, penetrating into cover 3b of hose 2, strongly opposes such extraction.

In other words, the kinetic energy of the projected hose is partly dissipated as energy for breaking and deforming cover 3b.

On the end portion 2a of hose 2, after full extraction, it is possible to notice the presence of a groove traced by tooth 56 on cover 3b of hose 2.

Innovatively, the holding back device according to the present invention allows partly dissipating the kinetic energy of the extracted hose.

Advantageously, moreover, the device allows keeping the incision plate in the correct position to interfere with the hose surface.

Advantageously, moreover, the mounting assembly is adapted for cooperating with bands of different sizes for hoses with different diameter.

What is claimed is:

1. A holding back device for holding a hose to a fixed abutment, wherein the hose comprises an outer cover, the device comprising:
    first connecting means adapted for realising a mechanical connection between the device and the fixed abutment;
    second connecting means adapted for realising a connection between the device and the hose;
    holding back means adapted for connecting the first connecting means to the second connecting means;
wherein the holding back means further comprise an incision plate adapted for penetrating at least partially into the cover of hose, wherein the incision plate comprises at least one tooth adapted for penetrating into the cover of the hose.

2. A device according to claim 1, wherein the tooth has a pointed end, for penetrating into the cover.

3. A device according to claim 1, wherein the tooth has an acute internal incidence angle.

4. A device according to claim 1, wherein the tooth is obtained at an end of the incision plate which, once the device is associated to the hose, faces the hose surface.

5. A device according to claim 1, wherein the device comprises two teeth, symmetrical relative to a symmetry axis of the incision plate.

6. A device according to claim 1, wherein the holding back means comprise a band adapted for being clamped to the surface of the hose.

7. A device according to claim 6, wherein the band comprises a ring and a sheath seated into the ring, wherein the sheath is intended to come into contact with the surface of the hose.

8. A device according to claim 7, wherein the sheath is adapted for allowing an expansion of the hose in a normal system operating configuration.

9. A device according to claim 6, wherein the incision plate is hinged to the band, the incision plate being adapted for rotating about an axis of rotation perpendicular to the front surface of the incision plate.

10. A device according to claim 9, wherein the anchoring member has a hole, wherein the hole has a hole axis perpendicular to a side surface of the incision plate, and
wherein the axis of rotation is perpendicular to the hole axis.

11. A device according to claim 1, wherein the first connecting means comprise an anchoring member.

12. A device according to claim 11, wherein the anchoring member has a hole, wherein the hole has a hole axis perpendicular to a side surface of the incision plate.

13. A device according to claim 1, further comprising support means adapted for keeping the incision plate into position when the device is associated to the hose.

14. A device according to claim 13, wherein the support means comprise a rope provided with bending stiffness.

15. A device according to claim 1, wherein the holding back devices comprise a rope.

16. A device according to claim 1, wherein in a normal operating configuration, the incision plate is in a non-turned arrangement and in a complete or partial hose extraction configuration, the incision plate is turned relative to the previous condition.

17. A mounting assembly for a holding back device for holding a hose to a fixed abutment, wherein the hose comprises a cover, wherein the assembly comprises:
    an anchoring member adapted for being connected to the abutment, and
    a rope for holding the hose to the abutment;
wherein the assembly further comprises an incision plate adapted for penetrating at least partly into the cover of the hose, wherein the incision plate comprises at least one tooth adapted for penetrating into the cover of the hose.

18. An assembly according to claim 17, wherein the hose can be clamped by a band and the incision plate is adapted for being hinged to the band.

19. An assembly according to claim 17, wherein the anchoring member has a hole, wherein the hole has a hole axis perpendicular to a side surface of the anchoring member and the incision plate has an axis of rotation perpendicular to a front surface of the incision plate, wherein the hole axis is perpendicular to the axis of rotation.

20. An assembly according to claim 17, wherein said at least one tooth having a pointed configuration.

21. An assembly according to claim 17, wherein the rope has a bending stiffness.

* * * * *